US012738399B2

(12) United States Patent
Akiyama et al.

(10) Patent No.: US 12,738,399 B2
(45) Date of Patent: Sep. 15, 2026

(54) LAMINATED CERAMIC COMPONENT

(71) Applicant: Panasonic Intellectual Property Management Co., Ltd., Osaka (JP)

(72) Inventors: Yuto Akiyama, Hokkaido (JP); Yasutaka Hanashiro, Hokkaido (JP); Keiji Kawajiri, Hokkaido (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 451 days.

(21) Appl. No.: 18/487,058

(22) Filed: Oct. 14, 2023

(65) Prior Publication Data

US 2024/0212892 A1 Jun. 27, 2024

(30) Foreign Application Priority Data

Dec. 27, 2022 (JP) ................................ 2022-210793

(51) Int. Cl.
*H01C 7/10* (2006.01)
*H01C 7/00* (2006.01)
(Continued)

(52) U.S. Cl.
CPC ............... *H01C 7/10* (2013.01); *H01C 7/008* (2013.01); *H01C 7/18* (2013.01); *H01G 4/008* (2013.01);
(Continued)

(58) Field of Classification Search
CPC . H01C 7/10; H01C 7/008; H01C 7/18; H01G 4/008; H01G 4/012; H01G 4/232; H01G 4/30
See application file for complete search history.

(56) References Cited

U.S. PATENT DOCUMENTS 9,922,765 B2 * 3/2018 Sawada .................. H01G 4/308
11,101,069 B2 * 8/2021 Matsui ..................... H01G 4/30
(Continued)

FOREIGN PATENT DOCUMENTS

JP 07-235406 9/1995
JP 2006135139 * 5/2006

OTHER PUBLICATIONS

JP 2006135139 machine translation (Year: 2006).*

*Primary Examiner* — Kyung S Lee
(74) *Attorney, Agent, or Firm* — Rimon P.C.

(57) ABSTRACT

A laminated ceramic component includes a sintered body, internal electrodes provided inside the sintered body, and external electrodes provided on a surface of the sintered body and electrically connected to the internal electrodes. The external electrodes include a first end-surface electrode provided on at least a portion of a first end surface of the sintered body, a second end-surface electrode provided on at least a portion of a second end surface of the sintered body, a first side-surface electrode provided on a portion of a first side surface of the sintered body, and a second side-surface electrode provided on a portion of a second side surface of the sintered body. Each of the first and second end-surface electrodes and the first and second side-surface electrodes contains metal and glass component. A content of the glass component in each of the first and second end-surface electrodes is different from a content of the glass component in each of the first and second side-surface electrodes.

10 Claims, 2 Drawing Sheets

(51) Int. Cl.

| | |
|---|---|
| ***H01C 7/18*** | (2006.01) |
| ***H01G 4/008*** | (2006.01) |
| ***H01G 4/012*** | (2006.01) |
| ***H01G 4/232*** | (2006.01) |
| ***H01G 4/30*** | (2006.01) |

(52) U.S. Cl.

CPC ............. *H01G 4/012* (2013.01); *H01G 4/232* (2013.01); *H01G 4/30* (2013.01)

(56) References Cited

U.S. PATENT DOCUMENTS

| | | | | |
|---|---|---|---|---|
| 11,482,378 | B2 * | 10/2022 | Onishi | H01G 4/0085 |
| 12,381,022 | B2 * | 8/2025 | Watanabe | H01C 7/1006 |
| 2011/0205684 | A1 * | 8/2011 | Yamamoto | H01G 4/232<br>29/25.42 |
| 2020/0194150 | A1 * | 6/2020 | Uchida | H01C 7/12 |

* cited by examiner

LAMINATED CERAMIC COMPONENT

TECHNICAL FIELD

The present disclosure relates to a laminated ceramic component, and more particularly to a laminated ceramic component used in various electronic equipment.

Related Art

Various laminated ceramic components, such as laminated varistors, are used in various electronic equipment, electronic devices. A laminated varistor is used to protect various electronic equipment and electronic devices from an abnormal voltage due to, e.g., a thunder surge or static electricity, or prevent malfunctions of electronic equipment and electronic devices due to a noise generated in circuits.

A conventional varistor has a low mounting density since the laminated varistor is mounted on a substrate one by one for each circuit. Therefore, improvement of the mounting density is being studied.

Japanese Patent Laid-Open Publication No. 7-235406 discloses a chip capacitive varistor which is a laminated ceramic component including a sheet-shaped base including a voltage nonlinear resistor porcelain, and plural pairs of internal electrodes which interpose the base and in which each pair of electrodes do not electrically contact each other.

The laminated ceramic component disclosed in Japanese Patent Laid-Open Publication No. 7-235406 is a four-terminal laminated ceramic component including an end-surface electrode and side-surface electrode as external electrodes.

SUMMARY

The four-terminal laminated ceramic component disclosed in Japanese Patent Laid-Open Publication No. 7-235406 may have a difference between an end-surface electrode and a side-surface electrode in a plating thickness of a plating electrode formed by, e.g., electroplating method to cover an external electrode or an adhesive strength difference between the external electrode and a sintered body. A large difference of the plating thickness may provide a risk to generate a portion of the plating electrode with low performance due to an excessively small plating thickness or to produce a portion of the plating electrode peeled off due to a stress in a case of soldering due to an excessively large plating thickness.

A laminated ceramic component according to an aspect of the present disclosure includes a sintered body, internal electrodes provided inside the sintered body, and external electrodes provided on a surface of the sintered body and electrically connected to the internal electrodes. The sintered body has a first end surface and a second end surface which face each other in a first direction, a first side surface and a second side surface which face each other in a second direction intersecting the first direction, and a first main surface and a second main surface which face each other in a third direction intersecting the first direction and the second direction. The plurality of external electrodes include: a first end-surface electrode provided on at least a portion of the first end surface; a second end-surface electrode provided on at least a portion of the second end surface; a first side-surface electrode provided on a portion of the first side surface; and a second side-surface electrode provided on a portion of the second side surface. Each of the first end-surface electrode, the second end-surface electrode, the first side-surface electrode, and the second side-surface electrode contains metal and glass component. A content of the glass component in each of the first end-surface electrode and the second end-surface electrode is different from a content of the glass component in each of the first side-surface electrode and the second side-surface electrode.

The laminated ceramic component according to the present disclosure more uniformly controls the plating thickness of the external electrodes and the adhesive strength thereof with the sintered body.

DETAILED DESCRIPTION (1) Overview

Figure 1:
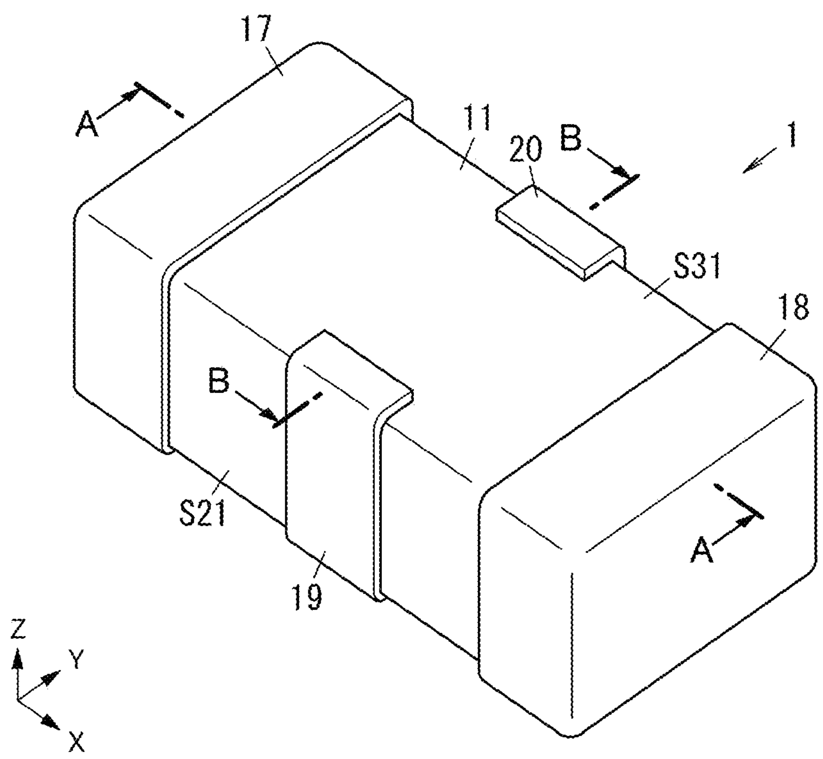
FIG. 1 is a perspective view of a laminated ceramic component according to an exemplary embodiment of the present disclosure.

A laminated ceramic component of an exemplary embodiment of the present disclosure will be described below with reference to the drawings. The drawings described in the following exemplary embodiment are schematic diagrams, and a ratio of a size and a thickness of each component in the drawings does not necessarily reflect the actual dimensional ratio.

Figure 2A:
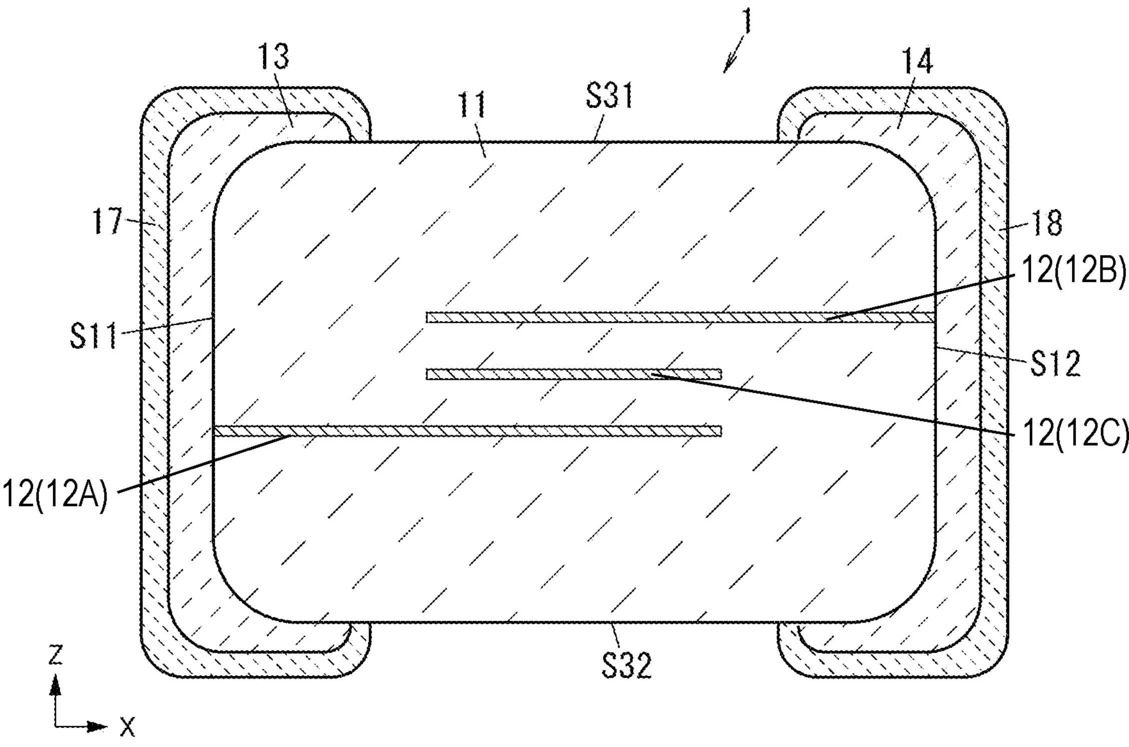
FIG. 2A is a cross-sectional view of the laminated ceramic component along a line A-A shown in FIG. 1.
Figure 2B:
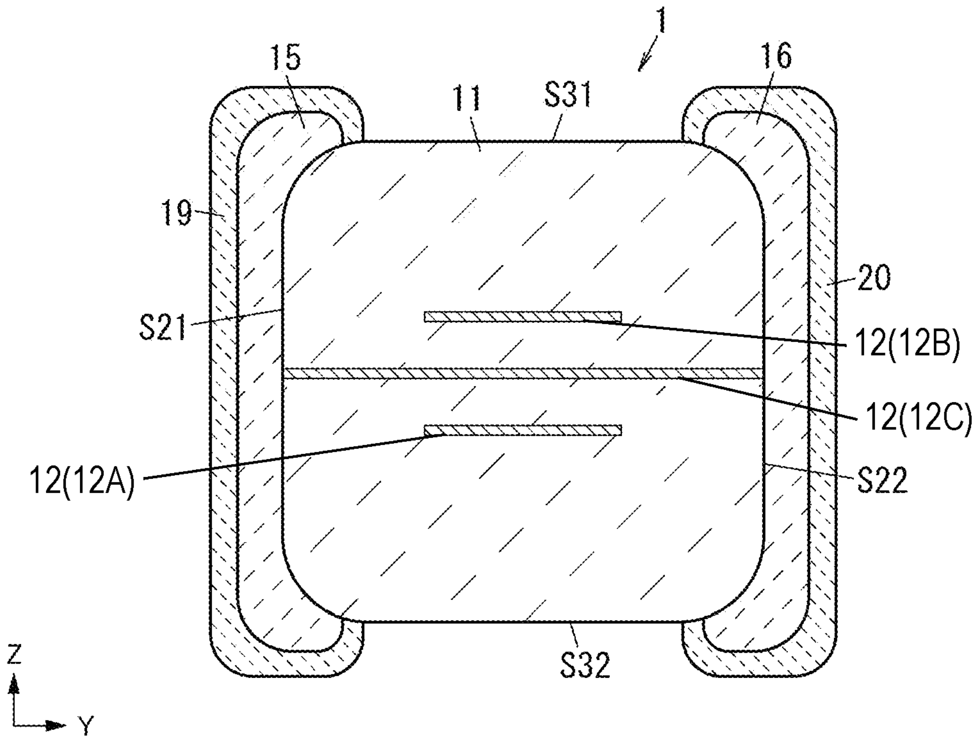
FIG. 2B is a cross-sectional view of the laminated ceramic component along a line B-B shown in FIG. 1.

FIG. 1 is a perspective view of laminated ceramic component 1 according to an exemplary embodiment. FIG. 2A is a cross-sectional view of laminated ceramic component 1 along a line A-A shown in FIG. 1. FIG. 2B is a cross-sectional view of laminated ceramic component 1 along a line B-B shown in of FIG. 1.

Laminated ceramic component 1 according to the embodiment includes sintered body 11, internal electrodes, and external electrodes (first end-surface electrode 13, second end-surface electrode 14, first side-surface electrode 15, and second side-surface electrode 16). Laminated ceramic component 1 may be, e.g., a laminated varistor, a laminated thermistor, or a laminated ceramic capacitor.

After conducting intensive studies to solve the aforementioned problems, the inventors has found that control a plating thickness or an adhesive strength with a sintered body were controlled by adjusting a content of a glass component in each of the external electrodes, and completed the present disclosure. In laminated ceramic component 1 according to the embodiment, the plating thickness of the external electrodes or the adhesive strength with the sintered body may be uniformly controlled.

Sintered body 11 of laminated ceramic component 1 has first end surface S11 and second end surface S12 which face each other in a first direction (an X direction), first side surface S21 and second side surface S22 which face each other in a second direction (a Y direction) intersecting the first direction (the X direction), and first main surface S31 and second main surface S32 which face each other in a third direction (a Z direction) intersecting the first direction (the X direction) and the second direction (the Y direction). In accordance with the embodiment, the first direction (the X direction), the second direction (the Y direction), and the third direction (the Z direction) are perpendicular to one another, but at least two directions of these directions may not be perpendicular to each other.

The external electrodes of laminated ceramic component 1 include first end-surface electrode 13, second end-surface electrode 14, first side-surface electrode 15, and second side-surface electrode 16. Each of first end-surface electrode 13, second end-surface electrode 14, first side-surface electrode 15, and second side-surface electrode 16 contains metal and glass component. Respective contents of the glass component in first end-surface electrode 13 and second end-surface electrode 14 is different from respective contents of the glass component in first side-surface electrode 15 and second side-surface electrode 16.

While it is not necessarily clear why laminated ceramic component 1 according to the embodiment with this configuration provides the above effects, it can be assumed as follows, for example. A thickness of a plating electrode formed by electroplating to cover the external electrode depends on each area or the like of the external electrode since the thickness is related to a current value of the external electrode during the electroplating. Therefore, it is considered that the different contents of the glass component in external electrodes to provide different resistance values of the external electrodes allow the current values of the external electrodes to more uniform, thereby uniformly control the thickness of the plating electrodes on the external electrodes. In addition, since the adhesive strength between the external electrodes and the sintered body depends on an area or a formation method of the external electrodes, it is considered that the different contents of the glass component in the external electrodes to differentiate the adhesive strength of the external electrodes to allow the adhesive strength to become more equal, thereby uniformly control the adhesive strength of the external electrodes to the sintered body.

(2) Details

Laminated Ceramic Component

Laminated ceramic component 1 according to the embodiment includes sintered body 11, internal electrodes 12, and the external electrodes which are first end-surface electrode 13, second end-surface electrode 14, first side-surface electrode 15, and second side-surface electrode 16.

Laminated ceramic component 1 preferably further includes plating electrodes covering respective at least portions of first end-surface electrode 13, second end-surface electrode 14, first side-surface electrode 15, and second side-surface electrode 16.

Laminated ceramic component 1 May further include a coating layer containing glass component and provided to cover at least a portion of sintered body 11 and to not cover the external electrodes. A configuration of laminated ceramic component 1 will be described below.

Sintered Body

Sintered body 11 has a rectangular parallelepiped shape having long sides in the X direction. Sides of the rectangular parallelepiped shape of sintered body 11 May be chamfered appropriately to round the sides of sintered body 11.

Sintered body 11 May have a laminated structure including plural layers stacked on one another in the Z direction. Sintered body 11 may be made of, e.g., semiconductor ceramic component having nonlinear resistance characteristics. Sintered body 11 may contain, as the semiconductor ceramic component, ZnO as main component, and at least one of $Bi_2O_3$, $Co_2O_3$, $MnO_2$, and $Sb_2O_3$ as auxiliary component. Alternatively, instead of the auxiliary component described above, sintered body 11 may contain at least one of $Pr_6O_{11}$, $Co_2O_3$, $CaCO_3$, and $Cr_2O_3$ as auxiliary component. Sintered body 11 has a laminated structure including stacked plural layers containing, for example, ZnO as a main component.

Internal Electrode

Internal electrodes 12 are provided inside sintered body 11 and partially exposed from sintered body 11. Each of internal electrodes 12 is electrically connected to respective one of external electrodes 13, 14, 15, and 16. Internal electrodes 12 may be at least one pair, and the number of internal electrodes 12 may be two or more, for example, three. In laminated ceramic component 1 shown in FIGS. 2A and 2B, the number of internal electrodes 12 is three. That is, internal electrodes 12 include first internal electrodes 12A, second internal electrodes 12B, and third internal electrodes 12C. First internal electrode 12A is electrically connected to first end-surface electrode 13, second internal electrode 12B is electrically connected to second end-surface electrode 14, and third internal electrode 12C is electrically connected to first side-surface electrode 15 and second side-surface electrode 16.

Internal electrode 12 contains at least Pd, and contains, for example, Pd or Ag—Pd.

External Electrode

The external electrodes include first end-surface electrode 13, second end-surface electrode 14, first side-surface electrode 15, and second side-surface electrode.

First end-surface electrode 13 is provided on at least a portion of first end surface S11. First end-surface electrode 13 May be provided on the entirety of first end surface S11. More specifically, first end-surface electrode 13 covers, for example, the entirety of first end surface S11 and respective portions of first side surface S21, second side surface S22, first main surface S31, and second main surface S32 adjacent to first end surface S11. Second end-surface electrode 14 is provided on at least a portion of second end surface S12. Second end-surface electrode 14 May be provided on the entirety of second end surface S12. More specifically, second end-surface electrode 14 covers, for example, the entirety of second end surface S12 and respective portions of first side surface S21, second side surface S22, first main surface S31, and second main surface S32 adjacent to second end surface S12.

First side-surface electrode 15 is provided on a portion of first side surface S21. That is, first side-surface electrode 15 covers the portion of first side surface S21. Second side-surface electrode 16 is provided on a portion of second side surface S22. That is, second side-surface electrode 16 covers the portion of second side surface S22.

Each of the external electrodes contain metal and glass component.

Examples of the metal include Ag, AgPd, and AgPt, and the external electors may preferably contain Ag.

The "glass component" refers to amorphous substance having a softening point. Examples of the glass component include silica-based glass and borosilicate glass.

The "a content of the glass component" refers to a concentration of the glass component in each electrode, and refers to, for example, a percentage (% by mass) of a mass of the glass component with respect to a mass of each electrode. The content of the glass component in the external electrode is, for example, 0.1% by mass or more and 50% by mass or less, preferably is 1% by mass or more and 30% by mass or less, more preferably is 2% by mass or more and 15% by mass or less, and more preferably is 4% by mass or more and 10% by mass or less with respect to the mass of the external electrode.

The respective contents of the glass component in first end-surface electrode 13 and second end-surface electrode 14 (hereinafter, also referred to as a content (end-surface electrode)) is different from the respective contents of the glass component in first side-surface electrode 15 and second side-surface electrode 16 (hereinafter, also referred to as a content (side-surface electrode)). The expression that "the content (end-surface electrode) is different from the content (side-surface electrode)" means that the content (end-surface electrode) and the content (side-surface electrode) have a difference of 10% or more (1.1 times or more) from each other.

Since the content (end-surface electrode) is different from the content (side-surface electrode), the plating thickness of the external electrodes or the adhesive strength with sintered body 11 may be uniformly controlled.

The content (side-surface electrode) is preferably less than the content (end-surface electrode). This configuration allows the plating thicknesses of the external electrodes to be more uniform.

A ratio ((side-surface electrode)/(end-surface electrode)) of the content (side-surface electrode) to the content (end-surface electrode) is preferably 0.01 or more and 0.9 or less, more preferably is 0.1 or more and 0.8 or less, even more preferably is 0.2 or more and 0.7 or less, and particularly preferably is 0.3 or more and 0.6 or less. This configuration allows the plating thicknesses of the external electrodes to be even more uniform.

The content (side-surface electrode) is also preferably more than the content (side-surface electrode). This configuration allows the adhesive strength of the external electrodes with sintered body 11 to be more uniform.

The ratio ((side-surface electrode)/(end-surface electrode)) of the content (side-surface electrode) to the content (end-surface electrode) is preferably 1.1 or more and 100 or less, more preferably is 1.2 or more and 10 or less, even more preferably is 1.4 or more and 5 or less, and particularly preferably is 1.7 or more and 3 or less. This configuration allows the adhesive strength of the external electrodes with sintered body 11 to be even more uniform.

Respective average thicknesses of the external electrodes are, for example, 1 μm or more and 80 μm or less, and preferably are 3 μm or more and 50 μm or less. The "average thickness" of a particular external electrode refers to, for example, an arithmetic mean value of thicknesses measured at plural points (for example, arbitrary 10 points) on the particular external electrode.

Respective average thicknesses of first side-surface electrode 15 and second side-surface electrode 16 (hereinafter, also referred to as the average thickness (side-surface electrode)) are preferably less than respective average thicknesses of first end-surface electrode 13 and second end-surface electrode 14 (hereinafter, also referred to as the average thickness (end-surface electrode)). This configuration enhances the effect providing uniform plating thickness of the external electrodes and uniform adhesive strength with sintered body 11.

A ratio ((side-surface electrode)/(end-surface electrode)) of the average thickness (side-surface electrode) to the average thickness (end-surface electrode) is preferably 0.01 or more and 0.9 or less, more preferably is 0.03 or more and 0.6 or less, even more preferably is 0.05 or more and 0.4 or less, and particularly preferably is 0.1 or more and 0.3 or less. This configuration enhances the effect providing the uniform plating thicknesses of the external electrodes and the uniform adhesive strength with sintered body.

An area of each external electrode contacting sintered body 11 (hereinafter, also referred to as a contact area) is, for example, 0.1 $mm^2$ or more and 1.6 $mm^2$ or less, and preferably is 0.2 $mm^2$ or more and 1.5 $mm^2$ or less.

Respective areas of first side-surface electrode 15 and of second side-surface electrode 16 contacting sintered body 11 (hereinafter, also referred to as a contact area (side-surface electrode)) are preferably smaller than respective areas of first end-surface electrode 13 and second end-surface electrode 14 contacting sintered body 11 (hereinafter, also referred to as a contact area (end-surface electrode)). This configuration enhances the effect providing the uniform plating thicknesses of the external electrodes and the uniform adhesive strength with sintered body 11.

A ratio ((side-surface electrode)/(end-surface electrode)) of the contact area (side-surface electrode) to the contact area (end-surface electrode) is preferably 0.01 or more and 0.9 or less, more preferably is 0.05 or more and 0.8 or less, even more preferably is 0.1 or more and 0.7 or less, and particularly preferably is 0.2 or more and 0.6 or less. This configuration enhances the effect providing the uniform plating thicknesses of the external electrodes or the uniform adhesive strength with sintered body 11.

Plating Electrode

Laminated ceramic component 1 further includes first end-surface plating electrode 17 which covers at least a portion of first end-surface electrode 13, second end-surface plating electrode 18 which covers at least a portion of second end-surface electrode 14, first side-surface plating electrode 19 which covers at least a portion of first side-surface electrode 15, and second side-surface plating electrode 20 which covers at least a portion of second side-surface electrode 16, as plating electrodes as shown in FIGS. 1, 2A, and 2B.

Plating electrodes 17, 18, 19, and 20 may be formed by performing Ni plating or performing Ni plating and Sn plating sequentially, for example, by an electroplating method.

Method for Manufacturing Laminated Ceramic Component

Next, a method for manufacturing laminated ceramic component 1 according to the embodiment will be described below.

Laminated ceramic component 1 according to the embodiment may be manufactured by applying an external electrode paste to sintered body 11 in which internal electrode 12 is formed, and forming external electrodes 13, 14, 15, and 16.

For sintered body 11, for example, powder containing ZnO as main component, and $Bi_2O_3$, $Co_2O_3$, $MnO_2$, $Sb_2O_3$, or the like or $Pr_6O_{11}$, $Co_2O_3$, $CaCO_3$, $Cr_2O_3$, or the like as auxiliary component is prepared, and a slurry is provided by adding solvent, plasticizer, or the like to the powder, and the obtained slurry is molded to have a sheet shape to form ceramic sheets. Next, internal electrode paste containing Pd, Ag, or the like is screen-printed on the ceramic sheets to form internal electrodes having a predetermined shape. Then, the ceramic sheets having internal electrodes formed thereon and ceramic sheets having no internal electrodes formed thereon are stacked on one another to form a laminated body. Then, this laminated body is cut to have a predetermined shape, thereby obtaining a green chip. This green chip is fired to provide sintered body 11 having a laminated structure including plural layers stacked on one another.

Next, the external electrode paste is applied to form external electrodes 13, 14, 15, and 16. As the external electrode paste, material containing metal and glass component is used. As a method of applying the external electrode paste, for example, a dipping method may be used to form first end-surface electrode 13 and second end-surface electrode 14. For example, a roller transfer method for pressing the external electrode paste attached to a relief plate against sintered body 11 to be applied may be used to form first side-surface electrode 15 and second side-surface electrode 16. Respective average thicknesses of the external electrodes formed are generally greater by the dipping method than by the roller transfer method. By performing baking after applying the external electrode paste, laminated ceramic component 1 including the external electrodes may be manufactured. In laminated ceramic component 1 including the external electrodes, plating electrodes 17, 18, 19, and 20 are formed to cover respective external electrodes by an electroplating method or the like, thereby providing laminated ceramic component 1 including the external electrodes and the plating electrodes.

As described in the above exemplary embodiment, the present disclosure includes the following aspects. In the following, reference numerals are given in parentheses just for clearly indicating the correspondence with the embodiment. Laminated ceramic component 1 according to a first aspect includes a sintered body (11), internal electrodes provided inside the sintered body (11), and external electrodes provided on a surface of the sintered body (11) and electrically connected to the internal electrodes. The sintered body (11) has a first end surface (S11) and a second end surface (S12) which face each other in a first direction, a first side surface (S21) and a second side surface (S22) which face each other in a second direction intersecting the first direction, and a first main surface (S31) and a second main surface (S32) which face each other in a third direction intersecting the first direction and the second direction. The external electrodes include a first end-surface electrode (13) provided on at least a portion of the first end surface (S11), a second end-surface electrode (14) provided on at least a portion of the second end surface (S12), a first side-surface electrode (15) provided on a portion of the first side surface (S21), and a second side-surface electrode (16) provided on a portion of the second side surface (S22). Each of the first end-surface electrode (13), the second end-surface electrode (14), the first side-surface electrode (15), and the second side-surface electrode (16) contains metal and glass component. A content of the glass component in each of the first end-surface electrode (13) and the second end-surface electrode (14) is different from a content of the glass component in each of the first side-surface electrode (15) and the second side-surface electrode (16).

According to the first aspect, it is possible to more uniformly control the plating thickness of the external electrodes and the adhesive strength thereof with the sintered body (11).

In laminated ceramic component 1 according to a second aspect, in the first aspect, the content of the glass component in the each of the first side-surface electrode (15) and the second side-surface electrode (16) is less than the content of the glass component in the each of the first end-surface electrode (13) and the second end-surface electrode (14).

According to the second aspect, it is possible to make the plating thickness of the plurality of external electrodes more uniform.

In laminated ceramic component 1 according to a third aspect, in the first or second aspect, the content of the glass component in the each of the first side-surface electrode (15) and the second side-surface electrode (16) is more than the content of the glass component in the each of the first end-surface electrode (13) and the second end-surface electrode (14).

According to the third aspect, it is possible to make the adhesive strength of the plurality of external electrodes with sintered body (11) more uniform.

In laminated ceramic component 1 according to a fourth aspect, in any one of first to third aspects, respective areas of the first side-surface electrode (15) and the second side-surface electrode (16) which contact the sintered body (11) are smaller than respective areas of the first end-surface electrode (13) and of the second end-surface electrode (14) which contact the sintered body (11).

According to the fourth aspect, it is possible to further improve the effect of making the plating thickness of the plurality of external electrodes or the adhesive strength with sintered body (11) uniform.

In laminated ceramic component 1 according to a fifth aspect, in any one of first to fourth aspects, respective average thicknesses of the first side-surface electrode (15) and the second side-surface electrode (16) are less than respective average thicknesses of the first end-surface electrode (13) and the second end-surface electrode (14).

According to the fifth aspect, it is possible to further improve the effect of making the plating thickness of the plurality of external electrodes or the adhesive strength with sintered body (11) uniform.

In laminated ceramic component 1 according to a sixth aspect, in any one of first to fifth aspects, laminated ceramic component 1 further includes plating electrodes which cover at least a portion of the first end-surface electrode (13), at least a portion of the second end-surface electrode (14), at least a portion of the first side-surface electrode (15), and at least a portion of the second side-surface electrode (16), respectively.

According to the sixth aspect, it is possible to make the thickness of the plurality of plating electrodes more uniform.

What is claimed is:

1. A laminated ceramic component comprising:

a sintered body;

a plurality of internal electrodes provided inside the sintered body; and a plurality of external electrodes provided on a surface of the sintered body and electrically connected to the plurality of internal electrodes, wherein the sintered body has a first end surface and a second end surface which face each other in a first direction, a first side surface and a second side surface which face each other in a second direction intersecting the first direction, and a first main surface and a second main surface which face each other in a third direction intersecting the first direction and the second direction, the plurality of external electrodes include:

a first end-surface electrode provided on at least a portion of the first end surface;

a second end-surface electrode provided on at least a portion of the second end surface;

a first side-surface electrode provided on a portion of the first side surface; and a second side-surface electrode provided on a portion of the second side surface, each of the first end-surface electrode, the second end-surface electrode, the first side-surface electrode, and the second side-surface electrode contains metal and glass component, and a mass percentage of the glass component in each of the first end-surface electrode and the second end-surface electrode is different from a mass percentage of the glass component in each of the first side-surface electrode and the second side-surface electrode.

2. The laminated ceramic component according to claim 1, wherein the mass percentage of the glass component in the each of the first side-surface electrode and the second side-surface electrode is less than the mass percentage of the glass component in the each of the first end-surface electrode and the second end-surface electrode.

3. The laminated ceramic component according to claim 1, wherein the mass percentage of the glass component in the each of the first side-surface electrode and the second side-surface electrode is more than the mass percentage of the glass component in the each of the first end-surface electrode and the second end-surface electrode.

4. The laminated ceramic component according to claim 1, wherein respective areas of the first side-surface electrode and the second side-surface electrode which contact the sintered body are smaller than respective areas of the first end-surface electrode and of the second end-surface electrode which contact the sintered body.

5. The laminated ceramic component according to claim 1, wherein respective average thicknesses of the first side-surface electrode and the second side-surface electrode are less than respective average thicknesses of the first end-surface electrode and the second end-surface electrode.

6. The laminated ceramic component according to claim 1, further comprising a plurality of plating electrodes which cover at least a portion of the first end-surface electrode, at least a portion of the second end-surface electrode, at least a portion of the first side-surface electrode, and at least a portion of the second side-surface electrode, respectively.

7. The laminated ceramic component according to claim 1, wherein the first end-surface electrode and the second end-surface electrode are formed from a first conductive paste, and the first side-surface electrode and the second side-surface electrode are formed from a second conductive paste, wherein the first conductive paste and the second conductive paste contain different mass percentages of the glass component.

8. The laminated ceramic component according to claim 1, wherein the mass percentage of the glass component in each of the first end-surface electrode and the second end-surface electrode is 1.1 times or more of the mass percentage of the glass component in each of the first side-surface electrode and the second side-surface electrode.

9. The laminated ceramic component according to claim 1, wherein the metal includes AgPt.

10. The laminated ceramic component according to claim 1, wherein the mass percentage of the glass component in each of the plurality of external electrodes is 0.1% or more and 50% or less.

* * * * *